United States Patent
Li et al.

(10) Patent No.: US 11,555,310 B2
(45) Date of Patent: Jan. 17, 2023

(54) COMPOSITE REBAR

(71) Applicant: Owens Corning Intellectual Capital, LLC, Toledo, OH (US)

(72) Inventors: Shoujie Li, Westerville, OH (US); Amol Vaidya, New Albany, OH (US); Matthew Donald Keener, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 69 days.

(21) Appl. No.: 17/283,347

(22) PCT Filed: Oct. 24, 2019

(86) PCT No.: PCT/US2019/057787
§ 371 (c)(1),
(2) Date: Apr. 7, 2021

(87) PCT Pub. No.: WO2020/106405
PCT Pub. Date: May 28, 2020

(65) Prior Publication Data
US 2021/0388616 A1   Dec. 16, 2021

Related U.S. Application Data (60) Provisional application No. 62/769,231, filed on Nov. 19, 2018.

(51) Int. Cl.
*E04C 5/07* (2006.01)
*B29D 99/00* (2010.01)
*B29K 309/08* (2006.01)

(52) U.S. Cl.
CPC ............ *E04C 5/07* (2013.01); *B29D 99/0003* (2013.01); *B29D 99/0046* (2013.01); *E04C 5/073* (2013.01); *B29K 2309/08* (2013.01)

(58) Field of Classification Search
CPC ....... E04C 5/07; E04C 5/073; B29D 99/0003; B29D 99/0046; B29C 70/20
See application file for complete search history.

(56) References Cited

U.S. PATENT DOCUMENTS

| | | | |
|---|---|---|---|
| 4,265,981 A | 5/1981 | Campbell | |
| 4,620,401 A * | 11/1986 | L'Esperance | B29C 70/205 411/908 |
| 5,047,104 A | 9/1991 | Preis et al. | |
| 5,077,113 A | 12/1991 | Kakihara et al. | |
| 5,127,783 A | 7/1992 | Moghe et al. | |

(Continued)

FOREIGN PATENT DOCUMENTS

| | | |
|---|---|---|
| CN | 2622288 Y | 6/2004 |
| CN | 1587576 A | 3/2005 |
| CN | 2900668 Y | 5/2007 |
| CN | 101466906 A | 6/2009 |

(Continued)

OTHER PUBLICATIONS

International Search Report and Written Opinion from PCT/US2019/057787 dated Oct. 24, 2019.

(Continued)

*Primary Examiner* — Patrick J Maestri
(74) *Attorney, Agent, or Firm* — Calfee, Halter & Griswold LLP (57) ABSTRACT

An improved shaped composite rebar is disclosed.

18 Claims, 10 Drawing Sheets

(56) References Cited

U.S. PATENT DOCUMENTS

| | | |
|---|---|---|
| 5,182,064 A | 1/1993 | Ishizuka et al. |
| 5,362,542 A | 11/1994 | Ozawa et al. |
| 5,626,700 A | 5/1997 | Kaiser |
| 5,650,220 A | 7/1997 | Greenwood |
| 5,727,357 A | 3/1998 | Arumugasaamy et al. |
| 6,048,598 A | 4/2000 | Bryan, III et al. |
| 6,197,395 B1 | 3/2001 | Van Vechten et al. |
| 6,221,295 B1 | 4/2001 | Kaiser et al. |
| 8,673,101 B2 | 3/2014 | Brandstrom |
| 9,162,399 B2 | 10/2015 | Gibson et al. |
| 9,387,605 B2 | 7/2016 | Tsukamoto |
| 9,885,181 B2 | 2/2018 | St-Cyr et al. |
| 2008/0141614 A1 | 6/2008 | Knouff et al. |
| 2008/0302063 A1 | 12/2008 | Braasch et al. |
| 2013/0180194 A1 | 7/2013 | Langone et al. |

FOREIGN PATENT DOCUMENTS

| | | | |
|---|---|---|---|
| CN | 101817227 A | | 9/2010 |
| DE | 102016111176 A1 | * | 12/2016 |
| EP | 0199348 A2 | | 10/1986 |
| WO | 9831891 A1 | | 7/1998 |
| WO | 2010048688 A1 | | 5/2010 |

OTHER PUBLICATIONS

Office Action from CN Application No. 201980075104.X dated Jun. 6, 2022.

Office Action from IN Application No. 202137019134 dated Sep. 29, 2022.

Office Action from SA Application No. 521422029 dated Jun. 30, 2022.

* cited by examiner

PRIOR ART

SECTION A-A

FIG. 3

PRIOR ART

COMPOSITE REBAR

CROSS-REFERENCE TO RELATED APPLICATIONS

This application is the U.S. national stage entry of PCT/US2019/057787, filed on Oct. 24, 2019, which claims priority to and any benefit of U.S. Provisional Patent Application No. 62/769,231, filed Nov. 19, 2018, the entire contents of which are incorporated herein by reference.

FIELD

The invention generally relates to rebar and, more particularly, to glass fiber-reinforced polymer (GFRP) rebar.

BACKGROUND

Rebar is commonly used to reinforce concrete structures such as roads, bridges, tunnels, airport runways, levies, parking decks, etc. In such structures, the rebar is embedded within the concrete where it mechanically and chemically binds therewith. The external surface of the rebar is often ribbed in order to enhance this binding. The concrete provides compression strength (roughly speaking, resistance to compression) and the rebar provides tensile strength (resistance to pulling).

Rebar products made out of composites of fibers and resin are known in the art, such as for example, disclosed in U.S. Pat. Nos. 5,650,220; 6,048,598; and 6,221,295, the entire disclosure of each being incorporated herein in its entirety by reference. Such composite rebar products provide advantages over those made out of steel. First and foremost, composite-material rebar does not experience the corrosion and degradation that steel does in some concrete environments. As the steel rebar corrodes, it loses strength, thereby becoming less effective at carrying tensile, compressive, bending, or shear loads. Further, as the rebar corrodes, it expands substantially and "blows apart" the surrounding concrete mass, thereby rendering the concrete less effective at carrying compressive loads. Other advantages of composite rebar include being non-metallic (or non-magnetic) and non-conductive, having about two to three times the tensile strength and ¼ the weight of steel reinforcing rod, and having a co-efficient of thermal expansion more compatible with concrete or rock than steel rod.

Such composite bars are often produced by a pultrusion process and have a linear or uniform profile. Conventional pultrusion processes involve drawing a bundle of reinforcing material (e.g., fibers or fiber filaments) from a source thereof, wetting the fibers and impregnating them (preferably with a thermo-settable polymer resin) by passing the reinforcing material through a resin bath in an open tank, pulling the resin-wetted and impregnated bundle through a shaping die to align the fiber bundle and to manipulate it into the proper cross sectional configuration, and curing the resin in a mold while maintaining tension on the filaments. Because the fibers progress completely through the pultrusion process without being cut or chopped, the resulting products generally have exceptionally high tensile strength in the longitudinal direction (i.e., in the direction the fiber filaments are pulled).

SUMMARY

It is proposed herein to provide an improved composite rebar construction, wherein at least a portion of the rebar has a non-linear shape.

The improvements to the shaped composite rebar can include, but are not limited to, one or more of increased glass content, increased elastic modulus, and increased tensile strength, as compared to conventional GFRP rebar.

In one exemplary embodiment, a composite rebar comprises: a plurality of continuous fibers arranged parallel to one another to form an elongated member, the fibers being impregnated with a resin matrix; and a fiber strand wrapped around an outer surface of the elongated member in a helical manner to form a plurality of adjacent coils, wherein the resin matrix is cured to fix the fibers relative to one another, wherein a distance between each adjacent pair of a first plurality of the adjacent coils is x, wherein a distance between each adjacent pair of a second plurality of the adjacent coils is y, and wherein x>y.

In some exemplary embodiments, x is in the range of 1.0 inches to 1.5 inches. In some exemplary embodiments, y is in the range of 0.1 inches to 0.9 inches.

In some exemplary embodiments, the continuous fibers are glass fibers. In some exemplary embodiments, an average diameter of the continuous glass fibers is within the range of 13 µm to 35 µm. In some exemplary embodiments, an average diameter of the continuous glass fibers is within the range of 17 µm to 32 µm.

In some exemplary embodiments, the resin matrix is a thermoset resin. In some exemplary embodiments, the resin matrix is selected from the group consisting of a polyester resin, a vinyl ester resin, a polyurethane resin, an epoxy resin, and combinations thereof.

In some exemplary embodiments, the fiber strand is formed of glass.

In some exemplary embodiments, the composite rebar further comprises a texturizing material applied to an outer surface of the elongated member. In some exemplary embodiments, the texturizing material is sand.

In some exemplary embodiments, the composite rebar further comprises a bend that causes the composite rebar to form a first straight portion and a second straight portion, wherein a central axis of the first straight portion and a central axis of the second straight portion intersect with one another at the bend to form an angle z, and wherein z>5 degrees. In some exemplary embodiments, z>45 degrees. In some exemplary embodiments, z>90 degrees.

In some exemplary embodiments, the bend includes more of the second plurality of the adjacent coils than the first plurality of the adjacent coils.

In some exemplary embodiments, the bend includes more of the second plurality of the adjacent coils than the first straight portion, and the bend includes more of the second plurality of the adjacent coils than the second straight portion.

In some exemplary embodiments, the fiber strand is wrapped around the outer surface of the elongated member in a helical manner such that the adjacent coils extend a length of the elongated member to form t distinct groups of the adjacent coils, wherein u groups of the adjacent coils each include a first plurality of the adjacent coils separated by a distance x, wherein v groups of the adjacent coils each include a second plurality of the adjacent coils separated by a distance y, wherein t=u+v, wherein x>y, wherein each of the u groups corresponds to a portion of the elongated member intended to remain straight, and wherein each of the v groups corresponds to a portion of the elongated member intended to be bent.

In some exemplary embodiments, the elongated member is formed by a pultrusion process. In some exemplary embodiments, the elongated member has a circular cross-section.

In one exemplary embodiment, a method of forming a composite rebar comprises: providing a plurality of continuous fibers arranged parallel to one another to form an elongated member; impregnating the fibers with a resin matrix; wrapping a fiber strand around an outer surface of the elongated member in a helical manner to form a plurality of first adjacent coils, each adjacent pair of the first adjacent coils being separated by a distance x; wrapping the fiber strand around an outer surface of the elongated member in a helical manner to form a plurality of second adjacent coils, each adjacent pair of the second adjacent coils being separated by a distance y; and partially curing the resin matrix to fix the fibers relative to one another and adhere the fiber stand to the elongated member, wherein x>y.

In some exemplary embodiments, x is in the range of 1.0 inches to 1.5 inches. In some exemplary embodiments, y is in the range of 0.1 inches to 0.9 inches.

In some exemplary embodiments, the continuous fibers are glass fibers. In some exemplary embodiments, an average diameter of the continuous glass fibers is within the range of 13 µm to 35 µm. In some exemplary embodiments, an average diameter of the continuous glass fibers is within the range of 17 µm to 32 µm.

In some exemplary embodiments, the resin matrix is a thermoset resin. In some exemplary embodiments, the resin matrix is selected from the group consisting of a polyester resin, a vinyl ester resin, a polyurethane resin, an epoxy resin, and combinations thereof.

In some exemplary embodiments, the fiber strand is formed of glass.

In some exemplary embodiments, the method further comprises applying a texturizing material to an outer surface of the elongated member. In some exemplary embodiments, the texturizing material is sand.

In some exemplary embodiments, the method further comprises: shaping the elongated member to have a first straight portion and a second straight portion, wherein a bent portion separates the first straight portion and the second straight portion; and fully curing the resin matrix to form the composite rebar.

In some exemplary embodiments, the elongated member is shaped to have four straight portions and four bent portions.

In some exemplary embodiments, a central axis of the first straight portion and a central axis of the second straight portion intersect with one another at the bent portion to form an angle z, wherein z>5 degrees. In some exemplary embodiments, z>45 degrees. In some exemplary embodiments, z>90 degrees.

In some exemplary embodiments, the bent portion includes more of the second adjacent coils than the first adjacent coils.

In some exemplary embodiments, the bent portion includes more of the second adjacent coils than the first straight portion, and the bent portion includes more of the second adjacent coils than the second straight portion.

In some exemplary embodiments, the elongated member has a circular cross-section.

In some exemplary embodiments, the step of providing the fibers arranged parallel to one another involves pultruding the fibers through at least one die.

In some exemplary embodiments, the step of impregnating the fibers with the resin matrix involves drawing the fibers through a resin bath.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which:

FIGS. 2A and 2B illustrate a conventional composite rebar.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass glass fiber-reinforced polymer (GFRP) rebar for reinforcing concrete and the like, as well as systems for and methods of producing such composite rebar. The inventive composite rebar has a construction that imparts improved mechanical properties. Accordingly, the following description of the general inventive concepts and exemplary embodiments thereof will focus on this innovative construction, along with the resulting beneficial properties of the resulting rebar.

Figure 1:
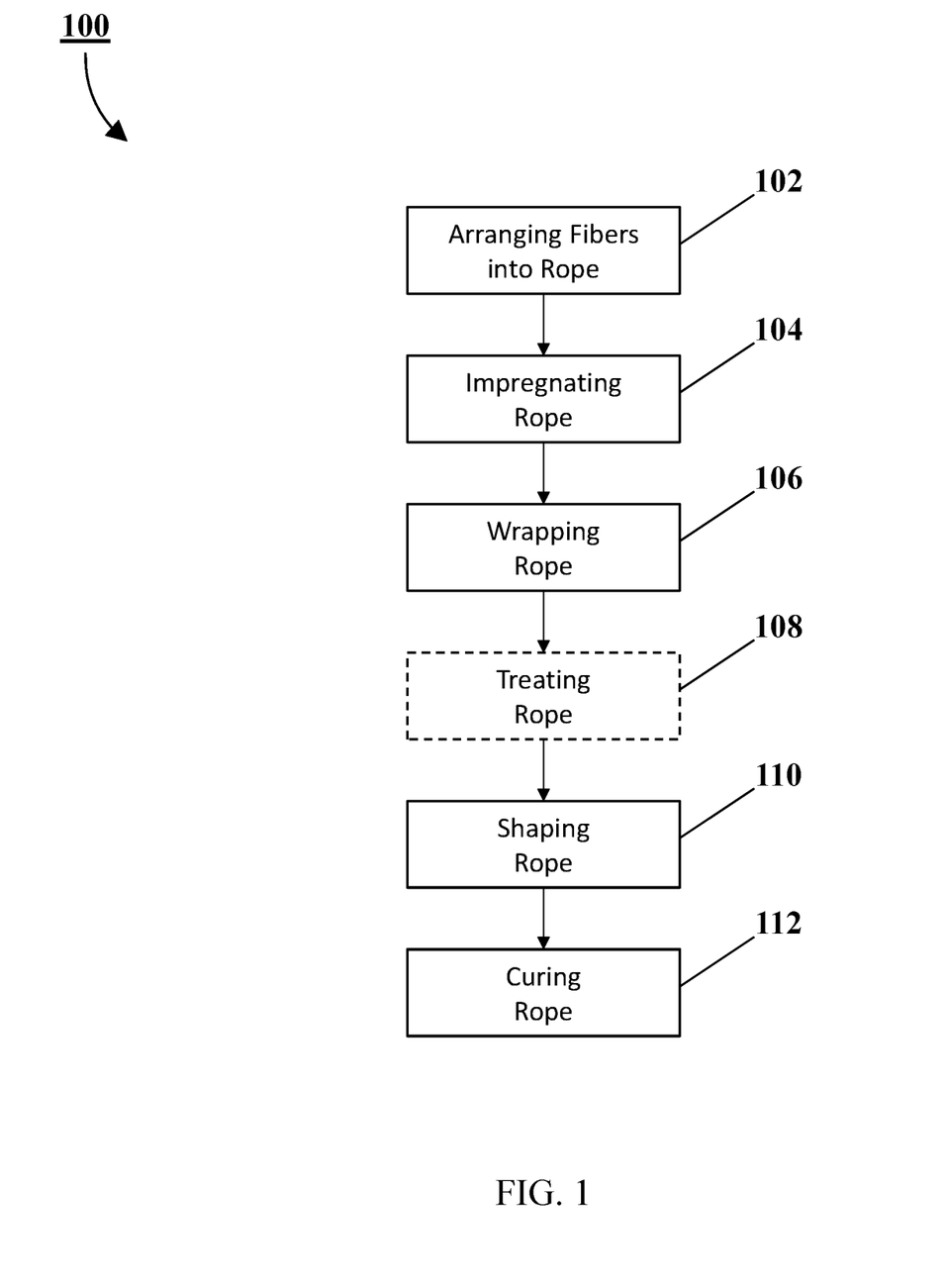
FIG. 1 is a flowchart showing a method of forming shaped composite rebar, according to one exemplary embodiment.

A general process 100 for forming composite rebar 200, such as GFRP rebar, according to one exemplary embodiment, will be described with reference to FIG. 1. As shown in FIG. 1, a multitude of fiber strands 202 (hereinafter, the "fibers") that will be used to form the composite rebar are arranged to be relatively parallel to one another, in step 102. For example, this arrangement can be achieved by structural elements that position the respective fibers 202 relative to one another. Typically, the fibers 202 will be under tension.

Figure 2A:
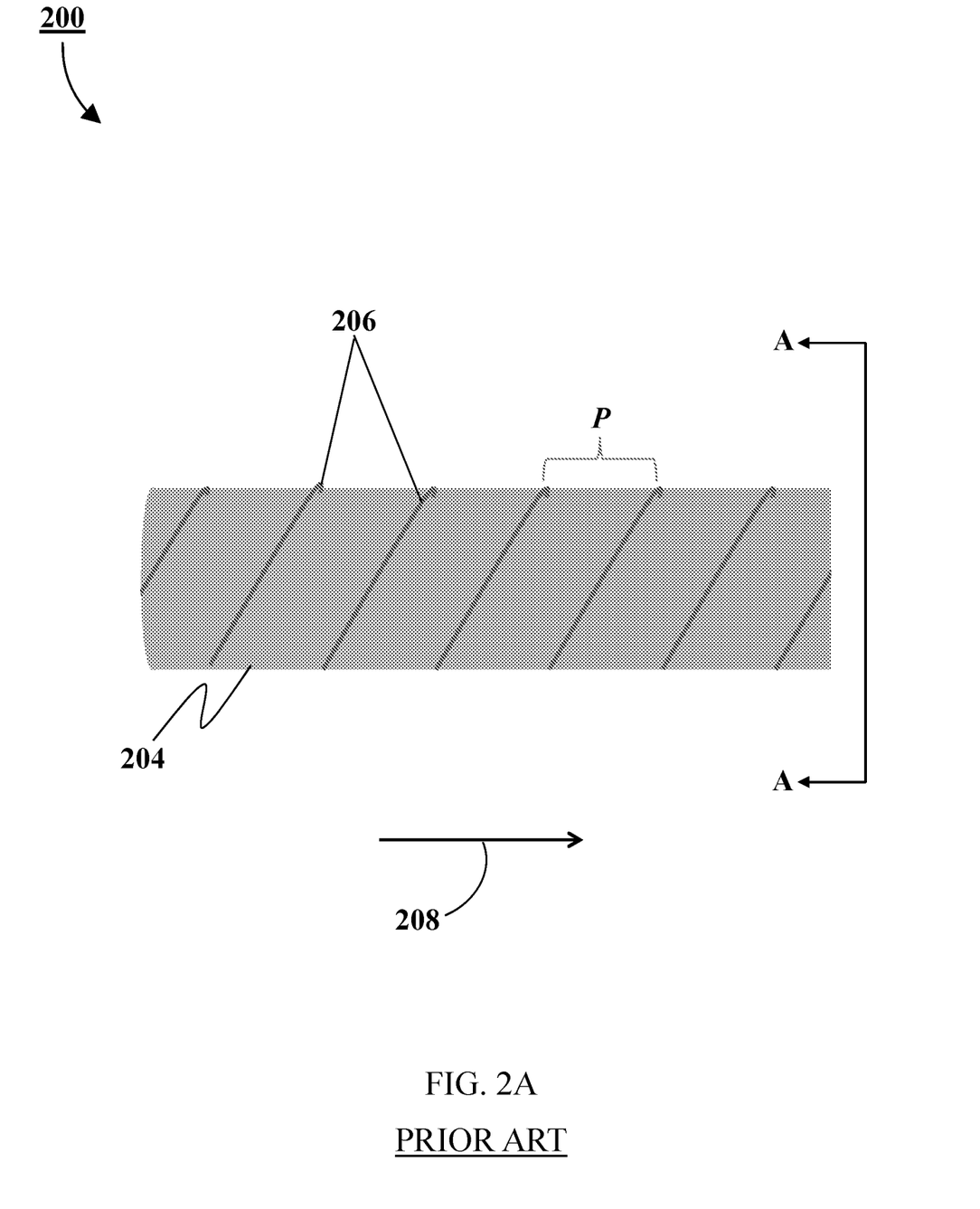
FIG. 2A is a lengthwise side elevational view of the composite rebar.
Figure 2B:
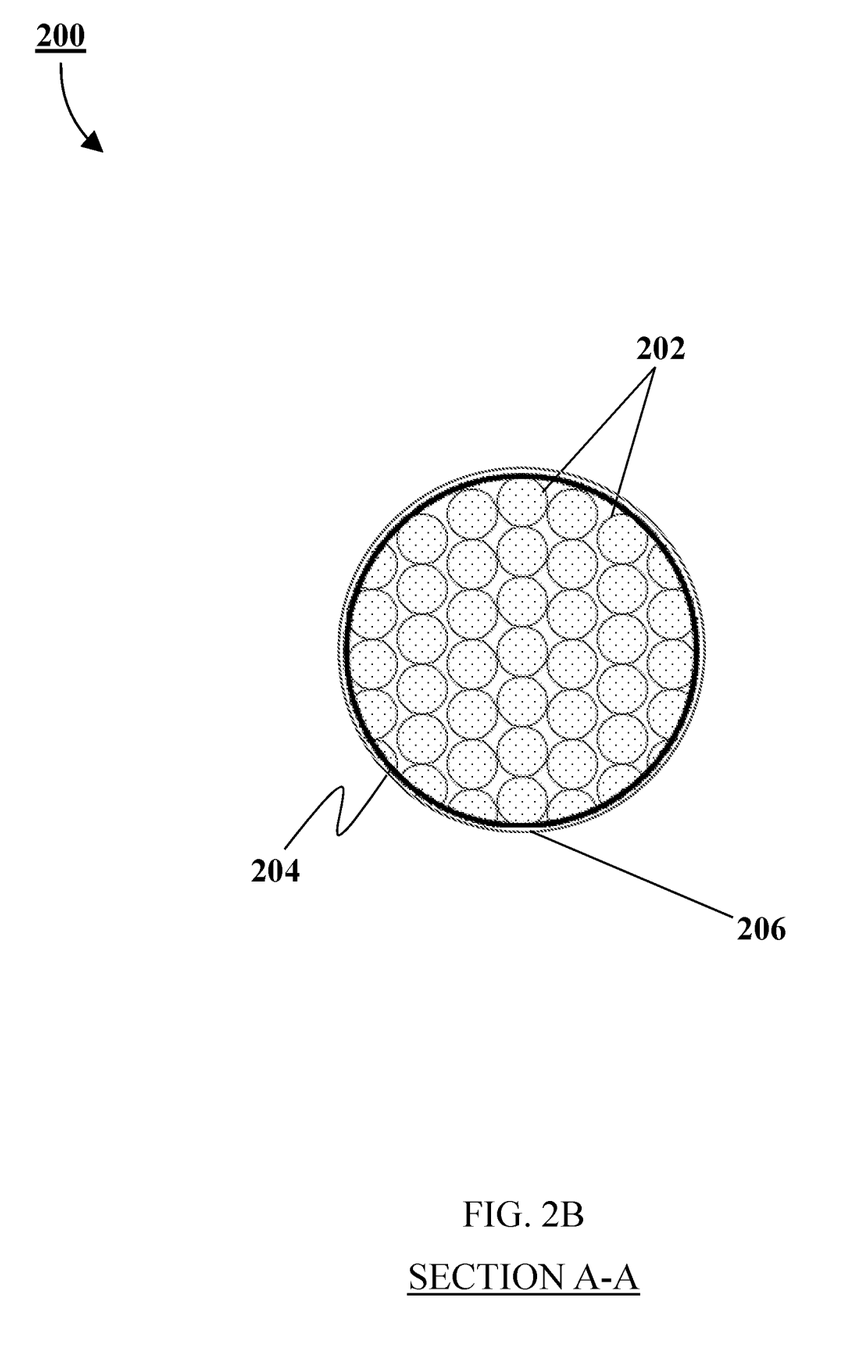
FIG. 2B is a cross-sectional view of the composite rebar, taken along line A-A of FIG. 2A.

The arrangement of the fibers 202 creates a rope-like member 204 (hereinafter, the "rope"), as shown in FIGS. 2A and 2B. The rope 204 has a relatively cylindrical profile, as shown in FIG. 2B. Each of the fibers 202 is made up of many individual filaments (e.g., glass filaments), as known in the art.

Next, the rope 204 is impregnated with resin, in step 104. Any suitable resin system can be used. Proper impregnation of the rope 204 ensures that the resin not only coats the outside of the rope 204 but also penetrates into and contacts inner fibers 202 of the rope 204, as well as filling voids between the fibers 202. In some exemplary embodiments, the rope 204 is impregnated with the resin by drawing the rope 204 through a bath of the resin.

Afterwards, the rope 204 is wrapped to hold the resin-impregnated fibers 202 together, in step 106. In particular, a fiber strand 206 (hereinafter, the "wrapping") is wrapped around an outer circumference of the rope 204, as shown in FIG. 2A.

The rope 204 can be formed to have any desired length. A direction of formation of the rope is illustrated by the arrow 208 in FIG. 2A. The direction of formation is parallel to a central (longitudinal) axis of the rope 204. The wrapping 206 is applied to the rope 204 in a helical manner (i.e., at an angle relative to the central axis of the rope 204), wherein the distance between corresponding portions of adjacent coils is considered the pitch P of the wrapping 206.

In some exemplary embodiments, a texturizing material (e.g., sand) is applied to an outer surface of the rope 204, in step 108. The texturizing material is intended to improve the anchoring of the composite rebar 200 in concrete.

Next, the resin-impregnated rope 204 is manipulated so that at least a portion of the rope 204 assumes a non-linear shape, in step 110. This shaping of the rope 204 can be achieved in any suitable manner. For example, the rope 204 can be bent over a fixed component (e.g., anvil). As another example, the rope 204 could be wound around a mandrel. As yet another example, the rope 204 could be wound around bars extending perpendicular to a rotating plate.

Finally, the resin is cured, in step 112. Full curing of the resin completes formation of the composite rebar 200. However, further processing of the composite rebar, such as cutting the composite rebar 200 into multiple pieces, is common. Full curing of the composite rebar 200 can take place in stages (e.g., involving different heating elements, different locations), and may take place over a relatively long period of time (e.g., days or weeks).

Conventionally, as shown in FIG. 2A, the wrapping 206 is applied to the rope 204 in a uniform manner (over a length of the rope 204), such that the pitch P does not vary. Conventionally, the pitch P of the wrapping 206 is relatively large, i.e., being 1 inch or greater. Consequently, when the rope 204 is shaped, the uniform and/or wide pitch P can lead to problems with and/or reduced performance by the shaped composite rebar, as described herein.

Figure 3:
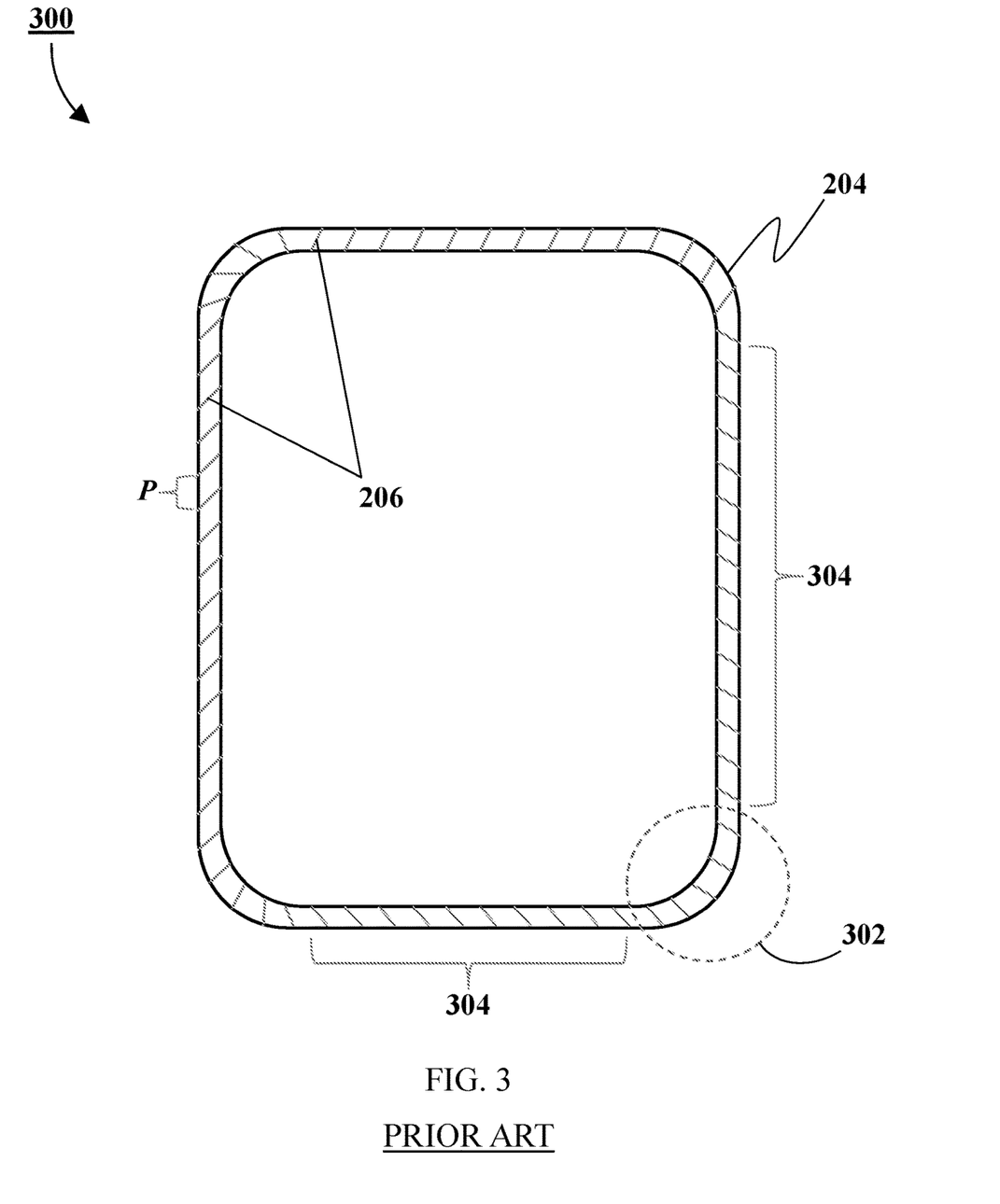
FIG. 3 illustrates a conventional shaped composite rebar.

For example, the rope 204 can be shaped in a circular, elliptical, or otherwise closed profile 300 (hereinafter, the "shaped rebar"), as shown in FIG. 3. Accordingly, the shaped rebar 300 has four bent portions 302 and four straight portions 304. Each of the bent portions 302 is adjacent to (and situated between) a pair of the straight portions 304. Likewise, each of the straight portions 304 is adjacent to (and situated between) a pair of the bent portions 302.

Because of stresses put on the rope 204 during shaping thereof, the fibers 202 in the bent portions 302 are more likely to move out of position or otherwise be disrupted than the fibers 202 in the straight portions 304. The wrapping 206 may prove insufficient to handle these stresses. As a result, the bent portions 302 of the shaped rebar 300 can exhibit bulges or the like that, in addition to lacking aesthetic appeal, call into question the performance of the shaped rebar 300. For example, while the straight portions 304 of the shaped rebar 300 have a relatively consistent circular cross-section, the bent portions 302 of the shaped rebar 300 have portions with a distorted cross-section (e.g., forming more of an ellipse than a circle).

In view of the above, it is proposed to form a shaped composite rebar that avoids, or otherwise mitigates against, these issues.

Figure 4:
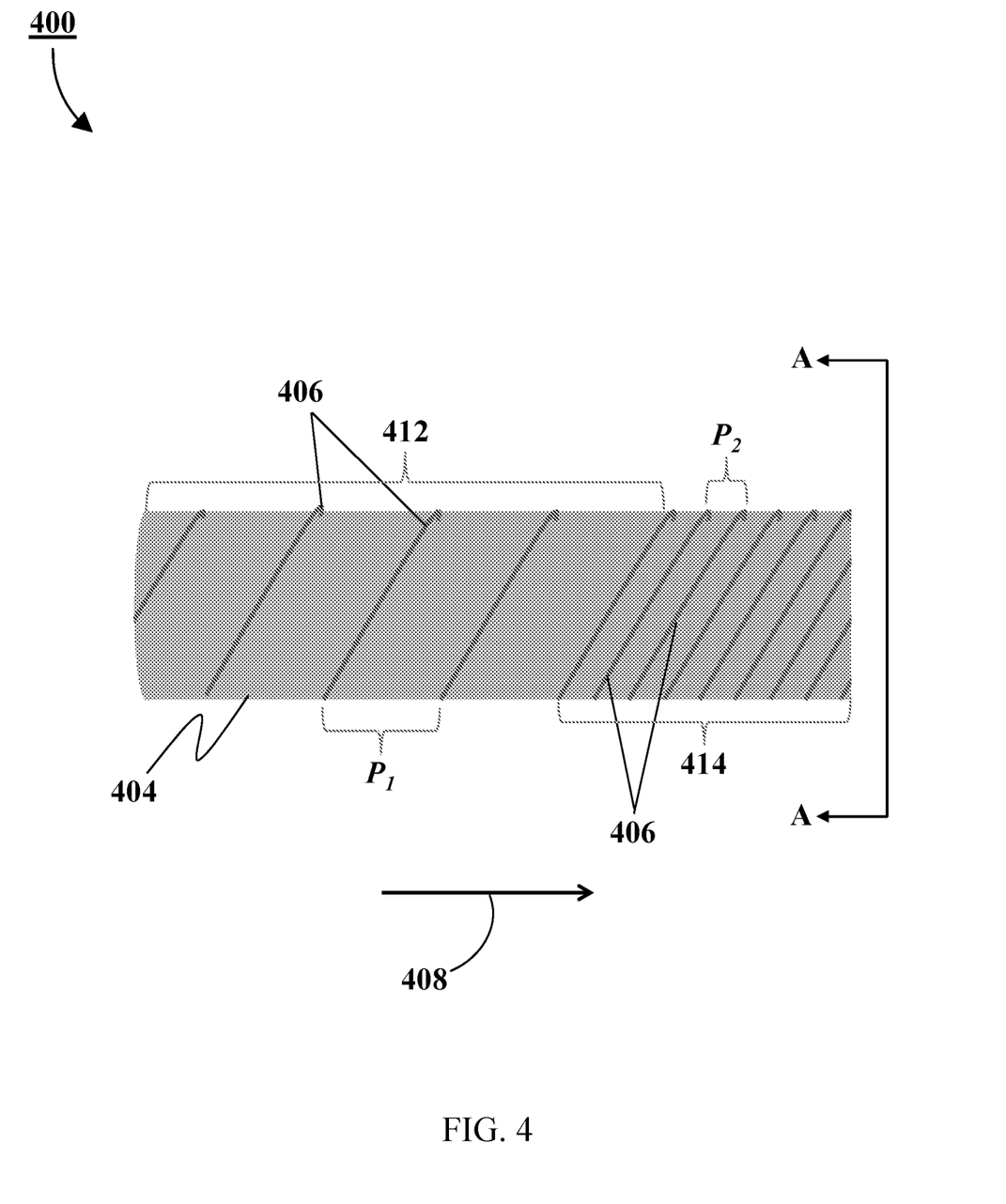
FIG. 4 illustrates an improved composite rebar, according to one exemplary embodiment.

First, a composite rebar 400 is formed (e.g., according to the process 100). The composite rebar 400 is formed by arranging a multitude of fiber strands (hereinafter, the "fibers") (not shown) to be relatively parallel to one another.

The arrangement of the fibers creates a rope-like member 404 (hereinafter, the "rope"), as shown in FIG. 4. The rope 404 has a relatively cylindrical profile. Each of the fibers is made of up of many individual filaments. In some exemplary embodiments, at least some of the filaments are glass. In some exemplary embodiments, all of the filaments are glass. Any suitable glass composition may be used to form the filaments. In some exemplary embodiments, the glass filaments are made of E-CR glass, such as that sold under the brand name Advantex® by Owens Corning of Toledo, Ohio. In some exemplary embodiments, a diameter of the glass filaments is within the range of 13 µm to 35 µm. In some exemplary embodiments, a diameter of the glass filaments is within the range of 17 µm to 32 µm.

Next, the rope 404 is impregnated with resin. Any suitable resin system can be used. In some exemplary embodiments, the resin is a thermosetting resin. In some exemplary embodiments, the resin is a polyester resin, a vinylester resin, a polyurethane resin, an epoxy resin, or a blend thereof. Proper impregnation of the rope 404 ensures that the resin not only coats the outside of the rope 404 but also penetrates into and contacts inner fibers of the rope 404, as well as filling voids between the fibers. In some exemplary embodiments, the rope 404 is impregnated with the resin by drawing the rope 404 through a bath of the resin.

Afterwards, the rope 404 is wrapped to hold the resin-impregnated fibers together. In particular, a fiber strand 406 (hereinafter, the "wrapping") is wrapped around an outer circumference of the rope 404, as shown in FIG. 4. In some exemplary embodiments, the wrapping 406 is made of the same material as the fibers. In some exemplary embodiments, the wrapping 406 is made of a different material than the fibers.

The rope 404 can be formed to have any desired length. A direction of formation of the rope is illustrated by the arrow 408 in FIG. 4. The direction of formation is parallel to a central (longitudinal) axis of the rope 404. The wrapping 406 is applied to the rope 404 in a helical manner (i.e., at an angle relative to the central axis of the rope 404), wherein the distance between corresponding portions of adjacent coils is considered the pitch P of the wrapping 406.

In some exemplary embodiments, a texturizing material (e.g., sand) is applied to an outer surface of the rope 404. The texturizing material is intended to improve the anchoring of the composite rebar 400 in concrete.

Next, the resin-impregnated rope 404 is manipulated so that at least a portion of the rope 404 assumes a non-linear shape. This shaping of the rope 404 can be achieved in any suitable manner. For example, the rope 404 can be bent over a fixed component (e.g., anvil). As another example, the rope 404 could be wound around a mandrel. As yet another example, the rope 404 could be wound around bars extending perpendicular to a rotating plate.

Finally, the resin is cured. Full curing of the resin completes formation of the composite rebar 400. However, further processing of the composite rebar, such as cutting the composite rebar 400 into multiple pieces, is common. Full curing of the composite rebar 400 can take place in stages (e.g., involving different heating elements, different locations), and may take place over a relatively long period of time (e.g., days or weeks).

It has been found that the wrapping 406 is critical to the pre-curing integrity of the arrangement of fibers forming the rope 404. More specifically, it has been found that careful control of the distribution of the wrapping along the rope 404 and/or a width of the pitch of the wrapping 406 results in composite rebar with improved processing and/or mechanical properties, particularly when the rebar is ultimately shaped to be non-linear.

In one exemplary embodiment, as shown in FIG. 4, the wrapping 406 is applied to the rope 404 in a non-uniform manner, such that the pitch P varies over a length of the rope 404. For example, the wrapping 406 is applied to a first portion 412 of the rope 404 with a first pitch $P_1$, while the wrapping 406 is applied to a second portion 414 of the rope 404 with a second pitch $P_2$. This process is repeated for each subsequent iteration of the first and second portions. In some exemplary embodiments, a length of the first portion 412 differs from a length of the second portion 414.

In general, $P_2 < P_1$. Typically, the first portion 412 and the second portion 414 are immediately adjacent to one another, such that no gaps (i.e., portions of the rope 404 without any wrapping 406) exist. In some exemplary embodiments, the first pitch $P_1$ is in the range of 0.1 inches to 1.5 inches. In some exemplary embodiments, the second pitch $P_2$ is in the range of 0.1 inches to 0.9 inches.

Consequently, when the rope 404 is shaped, the pitch variations (i.e., $P_1$ and $P_2$) mitigate against problems with and/or reduced performance by the shaped composite rebar.

Figure 5:
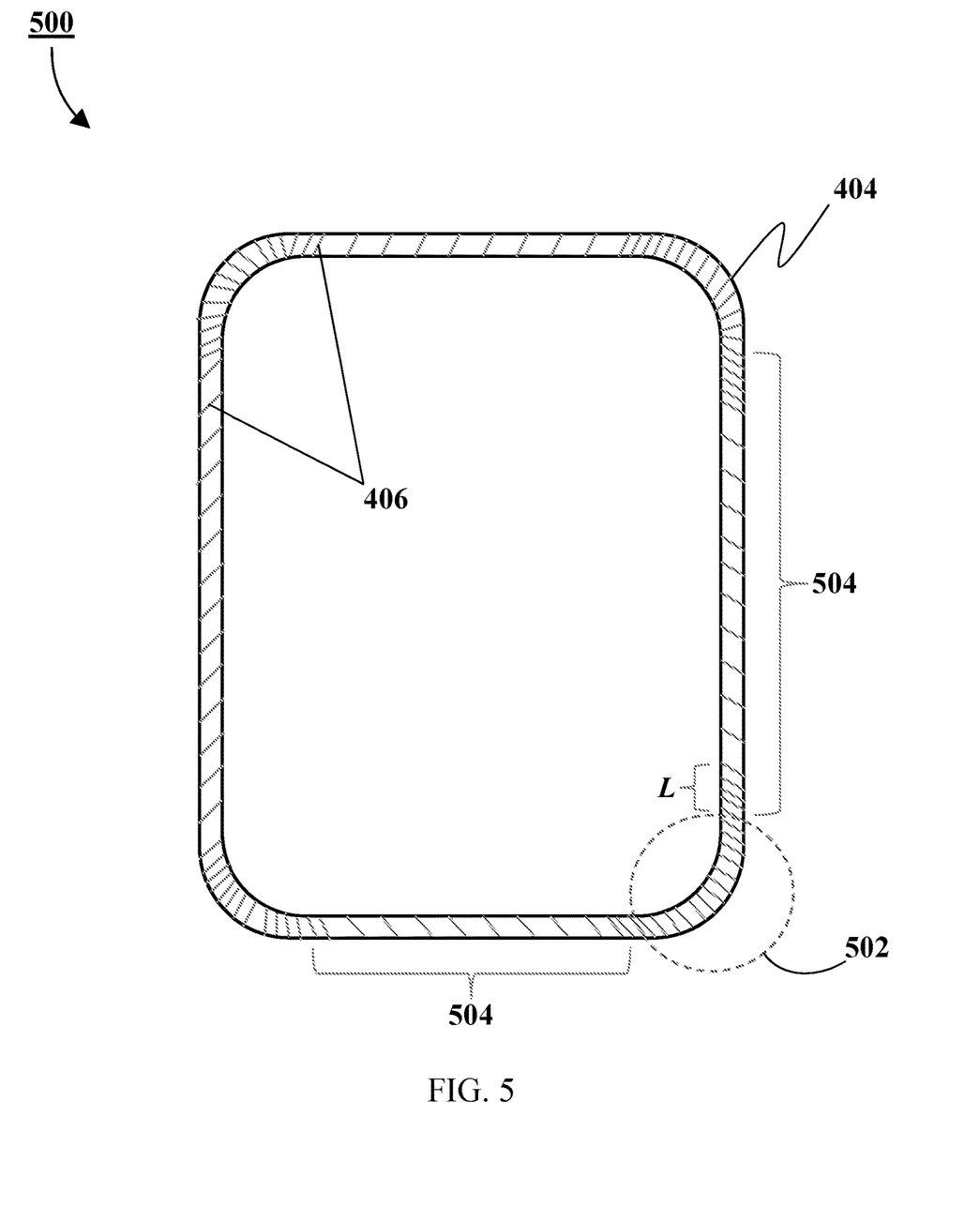
FIG. 5 illustrates a shaped composite rebar formed from the composite rebar of FIG. 4.

For example, the rope 404 can be shaped in a circular, elliptical, or otherwise closed profile 500 (hereinafter, the "shaped rebar"), as shown in FIG. 5. Accordingly, the shaped rebar 500 has four bent portions 502 and four straight portions 504. Each of the bent portions 502 is adjacent to (and situated between) a pair of the straight portions 504. Likewise, each of the straight portions 504 is adjacent to (and situated between) a pair of the bent portions 502.

In general, the straight portions 504 are linear with no deviations of greater than 3 degrees from the central axis of the original (unshaped) rope 404. The bent portions 502 are non-linear with a curvature from the central axis of the original (unshaped) rope 404 of greater than 3 degrees.

Because of stresses put on the rope 404 during shaping thereof, the fibers in the bent portions 502 are more likely to move out of position or otherwise be disrupted than the fibers in the straight portions 504. However, the use of a smaller pitch (i.e., the second pitch $P_2$) in the bent portions 502 allows the wrapping 406 to better resist these stresses. This is possible because each first portion 412 of the rope 404 corresponds to or overlaps with a straight portion 504 of the shaped rebar 500. Likewise, each second portion 414 of the rope 404 corresponds to or overlaps with a bent portion 502 of the shaped rebar 500. Consequently, a majority of the wrapping 406 applied to the first portion 412 will end up in a straight portion 504 of the shaped rebar 500, while a majority of the wrapping 406 applied to the second portion 414 will end up in a bent portion 502 of the shaped rebar 500. In some exemplary embodiments, a minority of the wrapping 406 applied to the second portion 414 will end up in one or both of the straight portions 504 adjacent to the bent portion 502 in which a majority of the wrapping 406 ends up. For example, as shown in FIG. 5, the wrapping 406 applied to the second portion 414 extends through a bent portion 502 and for a predetermined length L into each straight portion 504 adjacent to the bent portion 502. In some exemplary embodiments, the length L is in the range of 1 inch to 6 inches.

As a result, the bent portions 502 of the shaped composite rebar 500 are much less likely to be compromised (e.g., exhibit bulges) than with conventional shaped composite rebar (e.g., the rebar 300). Additionally, the cross-sectional profile of the shaped rebar 500 is more consistent than that typically achieved with conventional shaped composite rebar (e.g., the rebar 300).

In an alternative embodiment, the wrapping 406 is applied to the rope 404 in a uniform manner, but the pitch P is constrained to be less than 1 inch (e.g., in the range of 0.1 inches to 0.9 inches). As described above, because the wrapping 406 in the bent portions 502 of the shaped rebar 500 has a smaller pitch than conventionally used, shaping of the rope 404 to form the bent portions 502 is less likely to result in problems, inconsistencies, or the like in the shaped rebar 500.

Shaped composite rebar (e.g., the shaped rebar 500), as described herein, has been shown to exhibit improved properties when compared to conventional shaped composite rebar. See FIGS. 6-9. Additionally, the shaped composite rebar has been visually observed to exhibit a more consistent/regular appearance.

Figure 6:
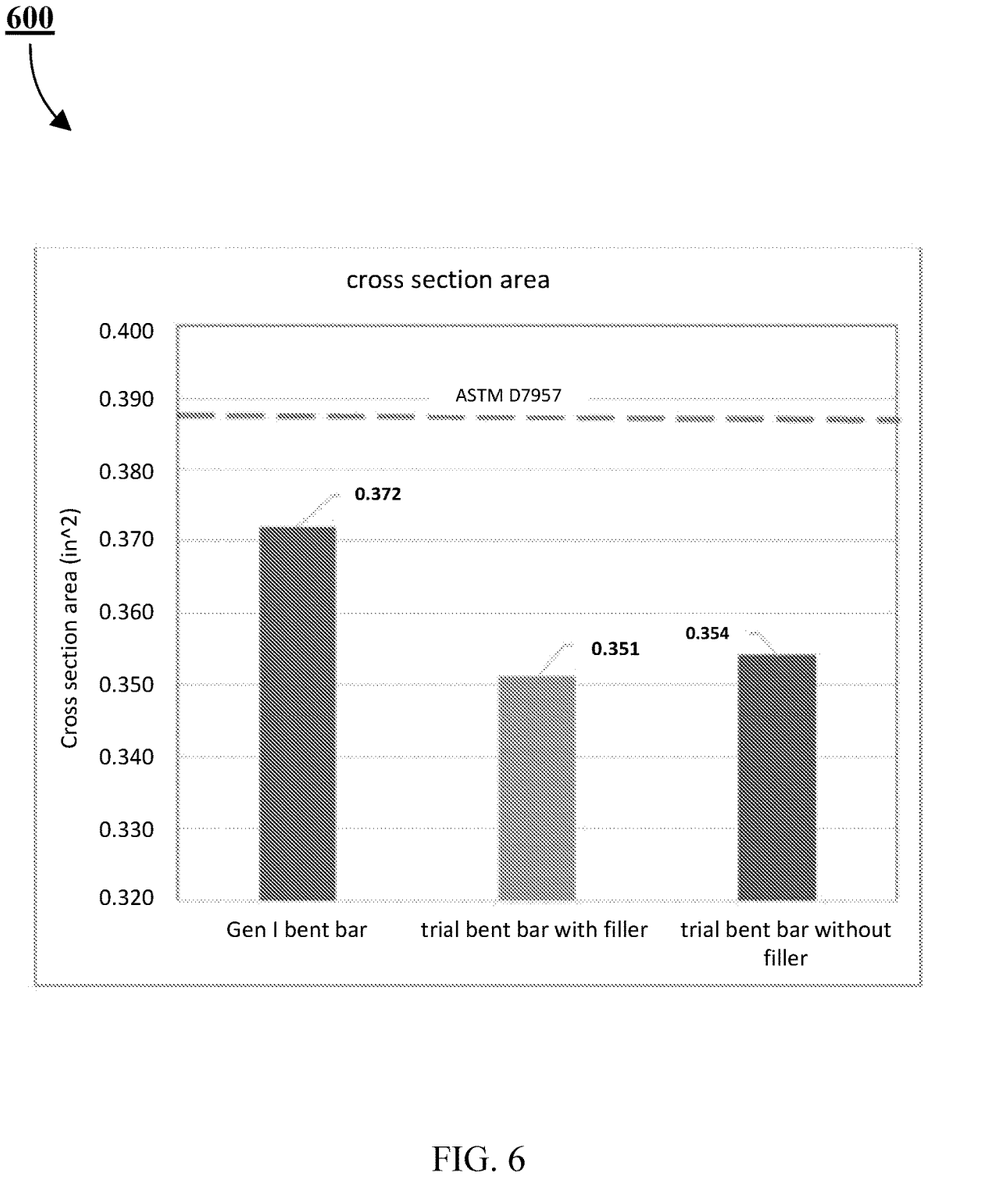
FIG. 6 is a table of cross-sectional area measurements for three shaped composite rebar samples.

FIG. 6 is a table 600 showing the cross-sectional area (in$^2$) of three shaped composite rebar samples: (1) a conventional shaped composite rebar (i.e., the "Gen I bent bar"), (2) a trial bent bar with filler, and (3) a trial bent bar without filler. A filler is an additive to the resin system that forms part of the composite rebar. In this case, the filler was clay. The dashed red line represents the limit on cross-sectional area as permitted by the ASTM D7957 standard.

Figure 7:
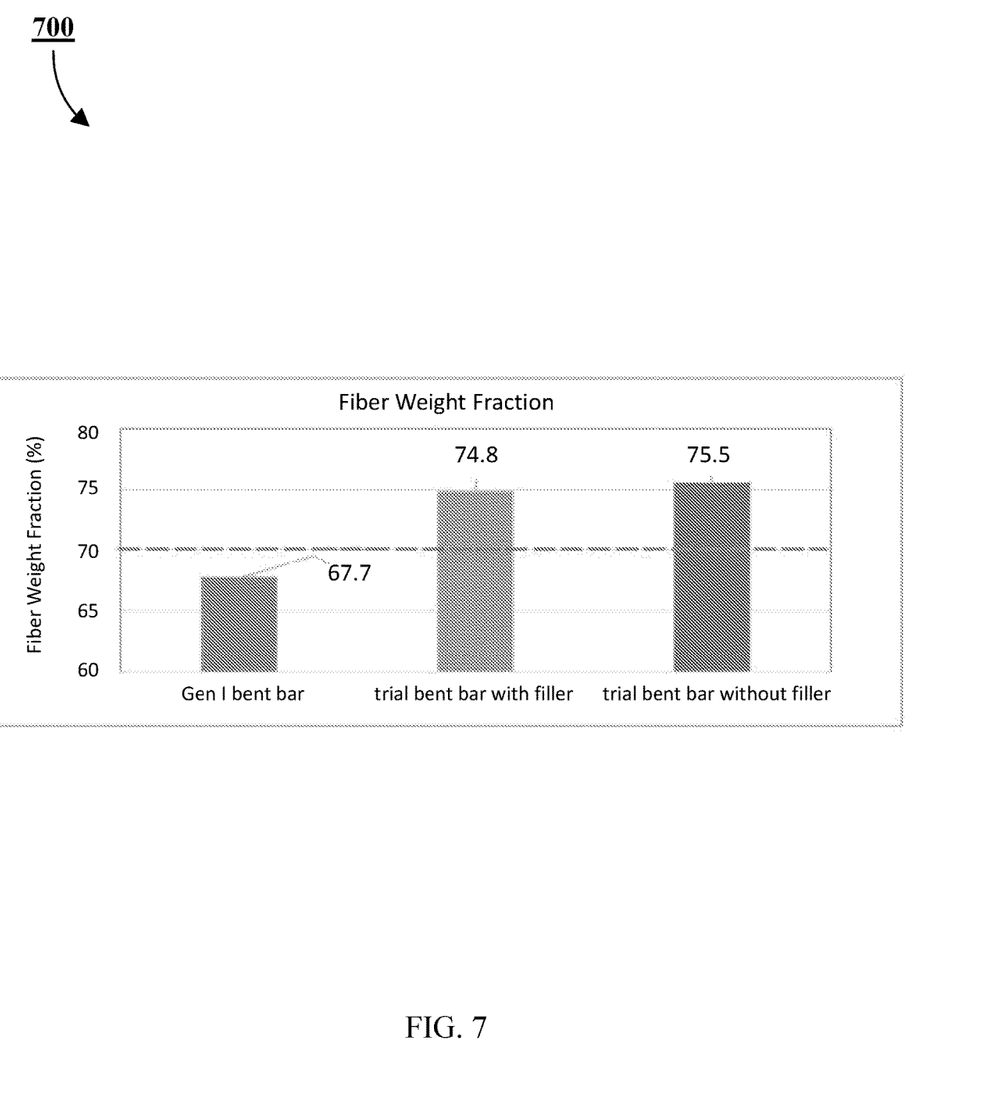
FIG. 7 is a table of fiber weight fraction measurements for three shaped composite rebar samples.

FIG. 7 is a table 700 showing the fiber weight fraction (%) of three shaped composite rebar samples: (1) a conventional shaped composite rebar (i.e., the "Gen I bent bar"), (2) a trial bent bar with filler, and (3) a trial bent bar without filler. In the case of GFRP rebar, the fiber weight fraction represents how much (what percentage of) glass is in the composite rebar. The dashed red line represents the minimum fiber weight fraction required to satisfy the ASTM D7957 standard.

Figure 8:
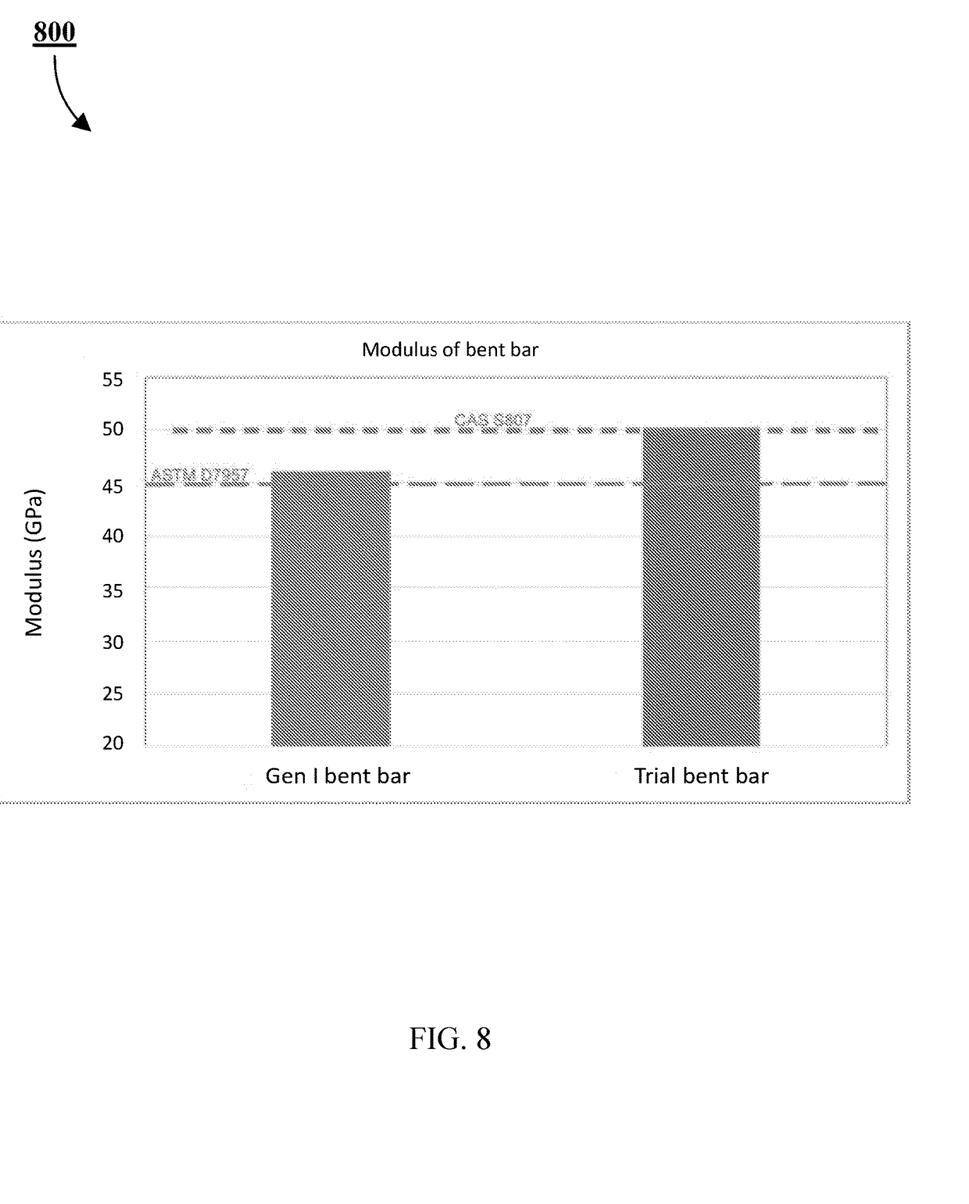
FIG. 8 is a table of modulus measurements for two shaped composite rebar samples.

FIG. 8 is a table 800 showing the elastic modulus (GPa) of two shaped composite rebar samples: (1) a conventional shaped composite rebar (i.e., the "Gen I bent bar") and (2) a trial bent bar (without filler). The upper dashed red line represents the minimum modulus required to satisfy the CAS 5807 standard, while the lower dashed red line represents the minimum modulus required to satisfy the ASTM D7957 standard.

Figure 9:
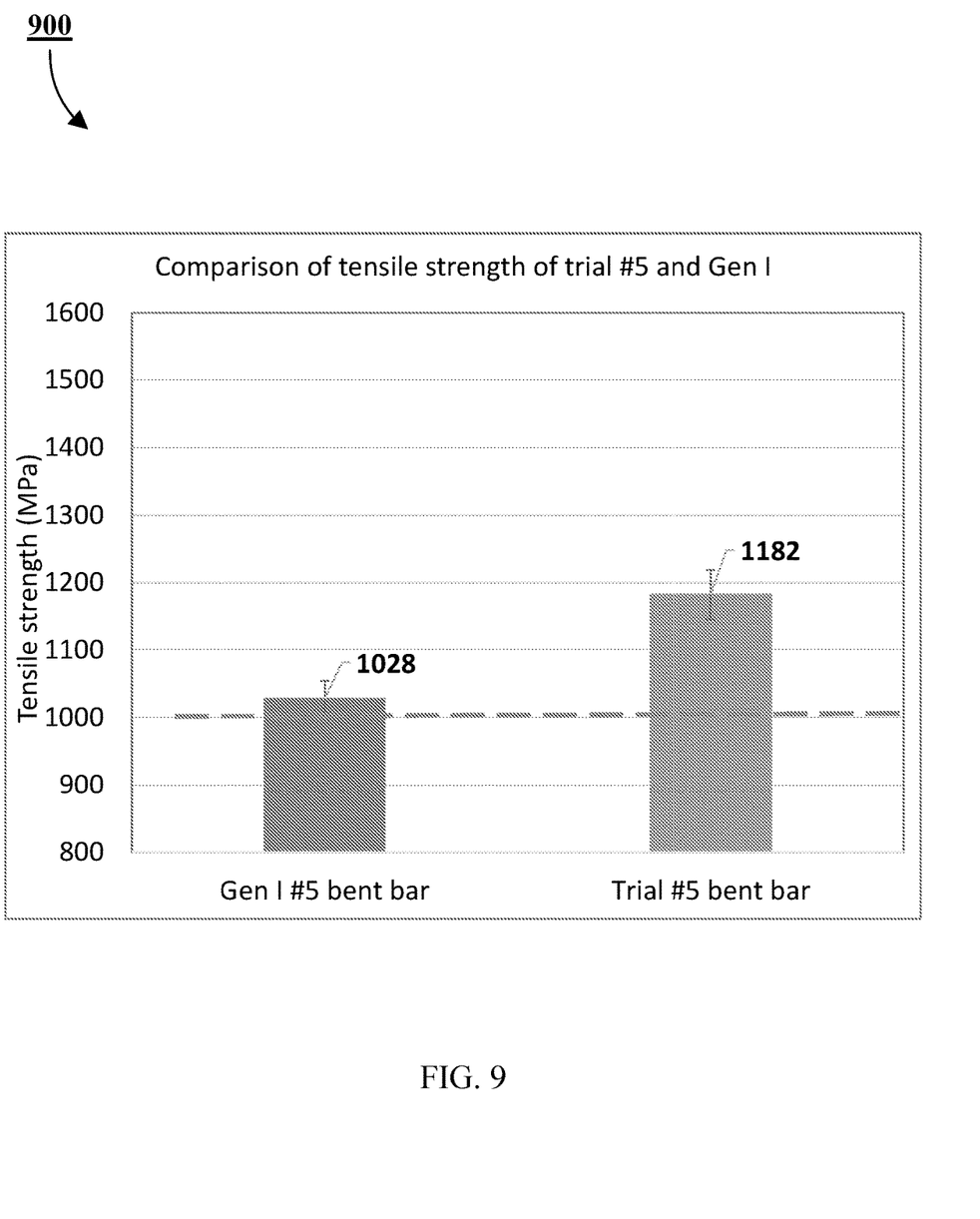
FIG. 9 is a table of tensile strength measurements for two shaped composite rebar samples.

FIG. 9 is a table 900 showing the tensile strength (MPa) of two shaped composite rebar samples: (1) a conventional shaped composite rebar (i.e., the "Gen I bent bar") and (2) a trial bent bar (without filler). The dashed red line represents the minimum tensile strength required to satisfy the ASTM D7957 standard.

It will be appreciated that the scope of the general inventive concepts is not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof.

The invention claimed is:

1. A composite rebar comprising:
    a plurality of continuous fibers arranged parallel to one another to form an elongated member, the fibers being impregnated with a resin matrix; and
    a fiber strand,
    wherein the resin matrix is cured to fix the fibers relative to one another,
    wherein the fiber strand is wrapped around an outer surface of the elongated member in a helical manner such that a plurality of adjacent coils extend a length of the elongated member to form t distinct groups of the adjacent coils,
    wherein one or more groups u of the adjacent coils each include a first plurality of the adjacent coils separated by a distance x,
    wherein one or more groups v of the adjacent coils each include a second plurality of the adjacent coils separated by a distance y,
    wherein x>y,
    wherein t=u+v,
    wherein each of the u groups corresponds to a straight portion of the elongated member, and
    wherein each of the v groups corresponds to a bent portion of the elongated member.

2. The composite rebar of claim 1, wherein the continuous fibers are glass fibers.

3. The composite rebar of claim 2, wherein an average diameter of the continuous fibers is within the range of 13 μm to 35 μm.

4. The composite rebar of claim 2, wherein an average diameter of the continuous fibers is within the range of 17 μm to 32 μm.

5. The composite rebar of claim 1, wherein the resin matrix is a thermoset resin.

6. The composite rebar of claim 1, wherein the resin matrix is selected from the group consisting of a polyester resin, a vinyl ester resin, a polyurethane resin, an epoxy resin, and combinations thereof.

7. The composite rebar of claim 1, wherein the fiber strand is formed of glass.

8. The composite rebar of claim 1, further comprising a texturizing material applied to an outer surface of the elongated member.

9. The composite rebar of claim 8, wherein the texturizing material is sand.

10. A composite rebar comprising:
    a plurality of continuous fibers arranged parallel to one another to form an elongated member, the fibers being impregnated with a resin matrix; and
    a fiber strand wrapped around an outer surface of the elongated member in a helical manner to form a plurality of non-overlapping adjacent coils, and
    a bend that causes the composite rebar to form a first straight portion and a second straight portion,
    wherein the resin matrix is cured to fix the fibers relative to one another,
    wherein a distance between each adjacent pair of a first plurality of the adjacent coils is x,
    wherein a distance between each adjacent pair of a second plurality of the adjacent coils is y,
    wherein x>y,
    wherein a central axis of the first straight portion and a central axis of the second straight portion intersect with one another at the bend to form an angle z,
    wherein z>5 degrees, and
    wherein the bend includes more of the second plurality of the adjacent coils than the first plurality of the adjacent coils.

11. The composite rebar of claim 10, wherein z>45 degrees.

12. A composite rebar comprising:
    a plurality of continuous fibers arranged parallel to one another to form an elongated member, the fibers being impregnated with a resin matrix; and
    a fiber strand wrapped around an outer surface of the elongated member in a helical manner to form a plurality of non-overlapping adjacent coils, and
    a bend that causes the composite rebar to form a first straight portion and a second straight portion,
    wherein the resin matrix is cured to fix the fibers relative to one another,
    wherein a distance between each adjacent pair of a first plurality of the adjacent coils is x,
    wherein a distance between each adjacent pair of a second plurality of the adjacent coils is y,
    wherein x>y,
    wherein a central axis of the first straight portion and a central axis of the second straight portion intersect with one another at the bend to form an angle z,
    wherein z>5 degrees,
    wherein the bend includes more of the second plurality of the adjacent coils than the first straight portion, and
    wherein the bend includes more of the second plurality of the adjacent coils than the second straight portion.

13. The composite rebar of claim 1, wherein x is in the range of 1.0 inches to 1.5 inches.

14. The composite rebar of claim 1, wherein y is in the range of 0.1 inches to 0.9 inches.

15. The composite rebar of claim 1, wherein the elongated member is formed by a pultrusion process.

16. The composite rebar of claim 1, wherein the elongated member has a circular cross-section.

17. A method of forming a composite rebar, the method comprising:
    providing a plurality of continuous fibers arranged parallel to one another to form a straight elongated member;
    impregnating the fibers with a resin matrix;
    wrapping a fiber strand around an outer surface of the elongated member in a helical manner to form a plurality of non-overlapping adjacent coils, each adjacent pair of a first plurality of the adjacent coils being separated by a distance x and each adjacent pair of a second plurality of the adjacent coils being separated by a distance y;
    forming a bend in the straight elongated member; and
    curing the resin matrix to fix the fibers relative to one another and adhere the fiber strand to the elongated member,
    wherein the bend includes more of the second plurality of the adjacent coils than the first plurality of the adjacent coils,
    wherein the distance y between at least one of the adjacent pairs of the second plurality of the adjacent coils increases to a distance y', and
    wherein x≥y'>y.

18. The composite rebar of claim 12, wherein z>45 degrees.

* * * * *